United States Patent
Kar et al.

(10) Patent No.: US 6,874,360 B1
(45) Date of Patent: Apr. 5, 2005

(54) METHOD OF DETERMINING RUBBING FRICTION TORQUE IN A MOTOR VEHICLE POWERTRAIN

(75) Inventors: Krishnendu Kar, Webster, NY (US); Sergio Eduardo Garcia, Webster, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/668,383

(22) Filed: Sep. 23, 2003

(51) Int. Cl.$^7$ ............................................. G01M 15/00
(52) U.S. Cl. ..................................................... 73/117.3
(58) Field of Search ............................. 73/116, 117.2, 73/117.3, 118.1; 701/29; 340/438, 439

(56) References Cited

U.S. PATENT DOCUMENTS

| | | | | |
|---|---|---|---|---|
| 5,823,912 | A | * 10/1998 | Fischer et al. | 477/97 |
| 6,094,614 | A | * 7/2000 | Hiwatashi | 701/89 |
| 6,580,994 | B2 | * 6/2003 | Katayama et al. | 701/69 |
| 6,650,987 | B2 | * 11/2003 | Kogure et al. | 701/80 |
| 6,704,639 | B2 | * 3/2004 | Amano | 701/102 |
| 6,772,058 | B2 | * 8/2004 | Miyazaki | 701/71 |
| 2002/0120383 | A1 | * 8/2002 | Miyazaki | 701/80 |
| 2003/0204302 | A1 | * 10/2003 | Amano | 701/102 |
| 2004/0210377 | A1 | * 10/2004 | Cullen | 73/117.3 |

* cited by examiner

*Primary Examiner*—Eric S. McCall
(74) *Attorney, Agent, or Firm*—Jimmy L. Funke

(57) ABSTRACT

A method of determining the rubbing friction torque involves characterizing fuel cutoff engine deceleration, and calculating the rubbing friction torque for any combination of engine speed and powertrain temperature is calculated in accordance with a base point rubbing friction torque RFT$_{base}$ determined at a base powertrain temperature T$_{base}$ and fuel cutoff characterization data. The calibration data characterizing fuel cutoff engine deceleration is obtained by alternately enabling and cutting off engine fuel delivery to cycle the engine speed between specified set points, and measuring and recording the engine deceleration during intervals of fuel cutoff. The rubbing friction torque RFT$_{test}$ at a given test temperature T$_{test}$ is calculated according to $$RFT_{test} = (RFT_{base} + PFT_{base}) \times \frac{DECEL_{test}}{DECEL_{base}} - PFT_{test},$$

where DECEL$_{test}$ and DECEL$_{base}$ are the fuel cutoff engine decelerations at the test and base points, respectively, and PFT$_{test}$, and PFT$_{base}$ are the pumping friction torques at the test and base points, respectively.

6 Claims, 3 Drawing Sheets

METHOD OF DETERMINING RUBBING FRICTION TORQUE IN A MOTOR VEHICLE POWERTRAIN

TECHNICAL FIELD

This invention relates to rubbing friction torque in a motor vehicle powertrain including an internal combustion engine, and more particularly to a method of determining the rubbing friction torque.

BACKGROUND OF THE INVENTION

The amount of torque an internal combustion engine must produce to compensate the rubbing friction of the powertrain is customarily referred to as the rubbing friction torque. In usual practice, the rubbing friction torque is measured for various operating conditions during engine calibration, and stored in a calibration table as a function of engine speed and powertrain temperature. During subsequent engine operation, the engine controller accesses the rubbing torque calibration table as part of its computation of engine output torque for various control algorithms such as electronic throttle control and electronic transmission control.

Measuring the rubbing friction torque is ordinarily accomplished by using an engine dynamometer to motor the engine under various combinations of speed and coolant temperature. Obviously, this can be a costly and time-consuming process, and can be performed for only a limited range of engine temperatures. Other methods are also possible, such as calculating the rubbing friction torque RFT during engine operation based on the relationship:

$$I\frac{d\omega}{dt} = IT - PFT - RFT$$

where I is the engine moment of inertia, $d\omega/dt$ is the engine acceleration, IT is the indicated torque of the engine, and PFT is the retarding torque due to pumping losses. But the moment of inertia I is difficult to estimate, and any estimation error is magnified by the engine acceleration which may be quite large. Although it is theoretically possible to obtain the test data at zero acceleration so that the term $I(d\omega/dt)$ is zero, such test conditions are difficult to achieve as a practical matter. Accordingly, what is needed is a more comprehensive and cost-effective method for calibrating the rubbing friction torque of an engine.

SUMMARY OF THE INVENTION

The present invention is directed to an improved method of determining the rubbing friction torque of a fully assembled motor vehicle powertrain, wherein the rubbing friction torque for any combination of engine speed and powertrain temperature is calculated in accordance with a base rubbing friction torque $RFT_{base}$ determined at a base point powertrain temperature $T_{base}$ and calibration data characterizing fuel cutoff engine deceleration (DECEL) as a function of engine speed and powertrain temperature. The calibration data characterizing fuel cutoff engine deceleration is obtained by alternately enabling and cutting off engine fuel delivery to cycle the engine speed between specified set points, and measuring and recording the engine deceleration during intervals of fuel cutoff. The rubbing friction torque $RFT_{test}$ at a given test point is calculated from the base rubbing friction torque $RFT_{base}$ according to:

$$RFT_{test} = (RFT_{base} + PFT_{base}) \times \frac{DECEL_{test}}{DECEL_{base}} - PFT_{test}$$

where $DECEL_{test}$ and $DECEL_{base}$ are the fuel cutoff engine decelerations at the test and base points, respectively, and $PFT_{test}$ and $PFT_{base}$ are the pumping friction torques at the test and base points, respectively.

DESCRIPTION OF THE PREFERRED EMBODIMENT

Figure 1:
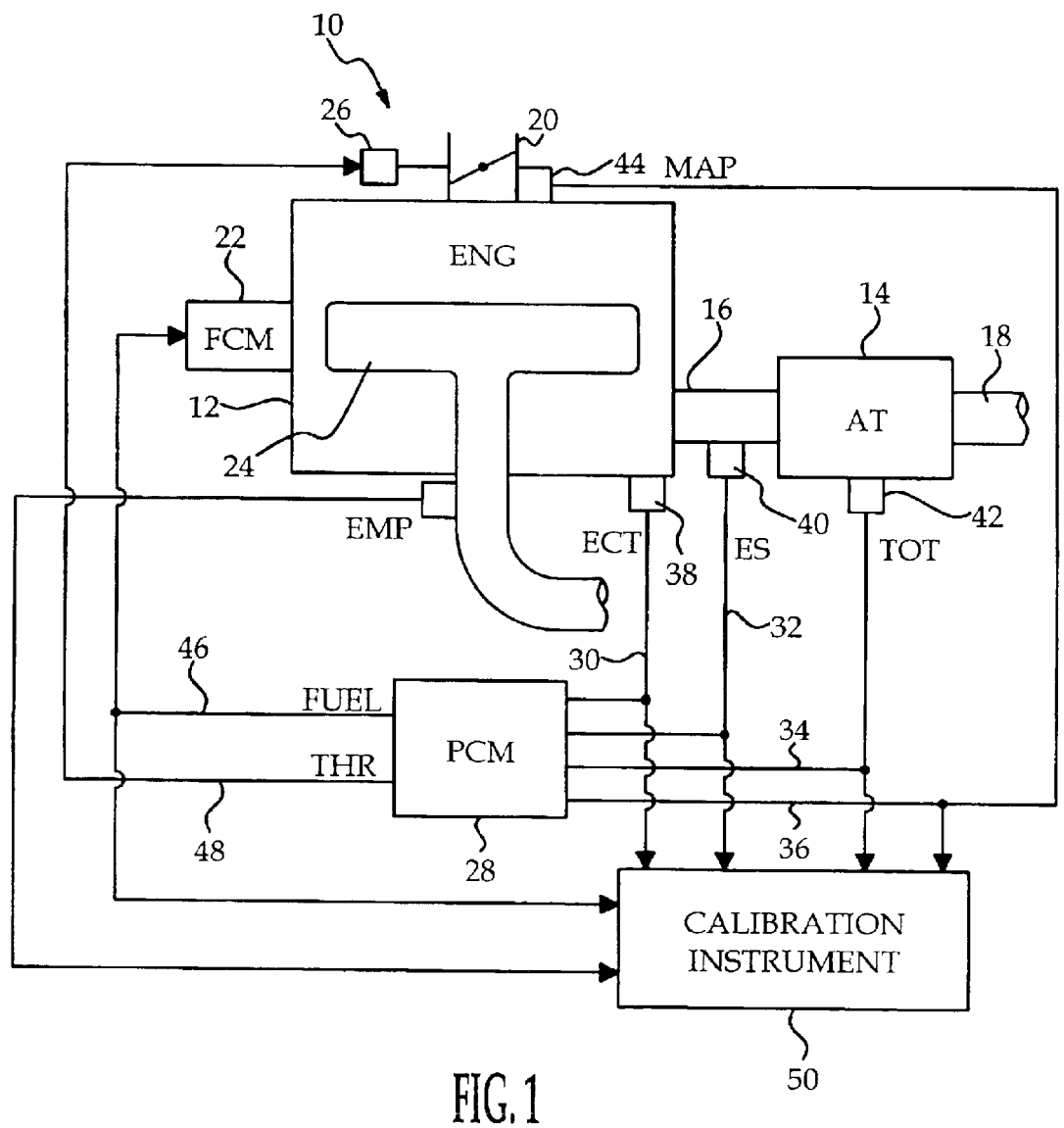
FIG. 1 is a diagram of a motor vehicle powertrain, a microprocessor-based powertrain control module (PCM) and calibration instrumentation apparatus according to this invention.

Referring to the drawings, and particularly to FIG. 1, the reference numeral 10 generally designates a motor vehicle powertrain, including an internal combustion engine (ENG) 12 and an automatic transmission (AT) 14. The engine output shaft 16 is coupled to the gear elements of transmission 14 through a fluid coupling or torque converter packaged with the transmission 14 and the transmission output shaft 18 is coupled to one or more drive wheels of the vehicle. The engine intake air is metered by throttle valve 20, a fuel control module (FCM) 22 injects fuel into the intake air to form an air/fuel mixture that is burned in the engine cylinders, and the combustion products are exhausted into exhaust manifold and header 24. The throttle valve 20 is coupled to a throttle actuator 26 that is controlled along with FCM 22 by a microprocessor-based powertrain control module (PCM) 28 to produce a desired engine output torque. Various input signals are provided to PCM 28 on lines 30, 32, 34 and 36. Line 30 carries an engine coolant temperature signal ECT produced by the temperature sensor 38, line 32 carries an engine speed signal ES produced by the speed sensor 40, line 34 carries a transmission oil temperature signal TOT produced by the temperature sensor 42, and line 36 carries manifold absolute pressure signal (MAP) produced by the pressure sensor 44. The PCM 28 produces an output signal FUEL for FCM 22 on line 46 and a throttle control signal THR for actuator 26 on line 48.

In usual practice, the PCM 28 is programmed to operate in various modes including a calibration mode and a run mode. Typically, the calibration mode is used for the purpose of measuring and recording calibration data, and the method of this invention uses a calibration mode software routine for cycling the engine speed ES between specified setpoints such as 1000 RPM and 6000 RPM. In raising the engine speed ES to the high setpoint of 6000 RPM, the PCM 28 controls FCM 22 and throttle actuator 26 to provide essentially wide-open-throttle acceleration of the engine 10; in subsequently lowering the engine speed ES to the low setpoint of 1000 RPM, the PCM 28 controls FCM 22 to cutoff the supply of fuel to engine 10. A short interval of such a control is graphically illustrated in FIG. 2, which depicts engine speed ES as a function of time.

FIG. 1 additionally depicts a conventional calibration data logging instrument 50 for recording various parameters of interest during the above-described calibration mode engine control. Such parameters will typically include not only the various inputs and outputs of PCM 28, but also certain other parameters that are not ordinarily measured in a production vehicle. For example, FIG. 1 depicts a pressure sensor 52 responsive to the gas pressure in exhaust manifold 24 for producing an exhaust manifold pressure signal (EMP) on line 54.

The rubbing friction torque of a powertrain 10 such as depicted in FIG. 1 will vary with both the engine speed ES and the operating temperature of the powertrain, which is characterized herein by the engine coolant temperature ECT (or alternately by the transmission oil temperature TOT). This relationship is reflected in the engine deceleration during the fuel cutoff intervals of the calibration testing depicted in FIG. 2, where the deceleration is the slope of the engine speed trace. In general, this invention recognizes that if the rubbing friction torque of powertrain 10 is known at a base point powertrain temperature, the rubbing friction at any powertrain temperature can be simply calculated using the base point rubbing friction torque and fuel cutoff engine deceleration characterization data.

When the engine 12 is not producing torque due to fuel combustion, the product of the engine's moment of inertia I and deceleration dω/dt is equal to the sum of the pumping loss torque PFT and the rubbing friction torque RFT.

That is:

$$I\frac{d\omega}{dt} = PFT + RFT \tag{1}$$

However, since the moment of inertia I is constant for any given engine, it can be concluded that:

$$\frac{RFT_1 + PFT_1}{RFT_2 + PFT_2} = \frac{DECEL_1}{DECEL_2} \tag{2}$$

where $PFT_1$ and $PFT_2$ are retarding torques due to pumping losses at two different powertrain temperatures signified by the subscripts 1 and 2, $RFT_1$ and $RFT_1$ are retarding torques due to rubbing friction torque at the two powertrain temperatures, and $DECEL_1$ and $DECEL_2$ are engine deceleration values due to the retarding torques. If the subscript "base" is used to represent data pertaining to a base point rubbing friction torque $RFT_{base}$, and the subscript "test" is used to represent data pertaining to a test condition other than the base point, equation (1) may be rewritten as:

$$RFT_{test} = \tag{3}$$
$$(RFT_{base} + PFT_{base}) \times \frac{DECEL_{test}}{DECEL_{base}} - PFT_{test} \Rightarrow RFT_{test} = \left[RFT_{base} \times \left(\frac{DECEL_{test}}{DECEL_{base}}\right)\right] + \left[PFT_{base} \times \left(\frac{DECEL_{test}}{DECEL_{base}}\right) - PFT_{test}\right]$$

In many cases, the second term of the above equation can be neglected if the testing is performed with engine 12 at wide-open throttle, which minimizes pumping losses. Additionally, test data shows that pumping friction torque is proportional to deceleration, so that $(PFT_{base}*DECEL_{test})/DECEL_{base}$ is very nearly equal to $PFT_{test}$.

Figure 5:
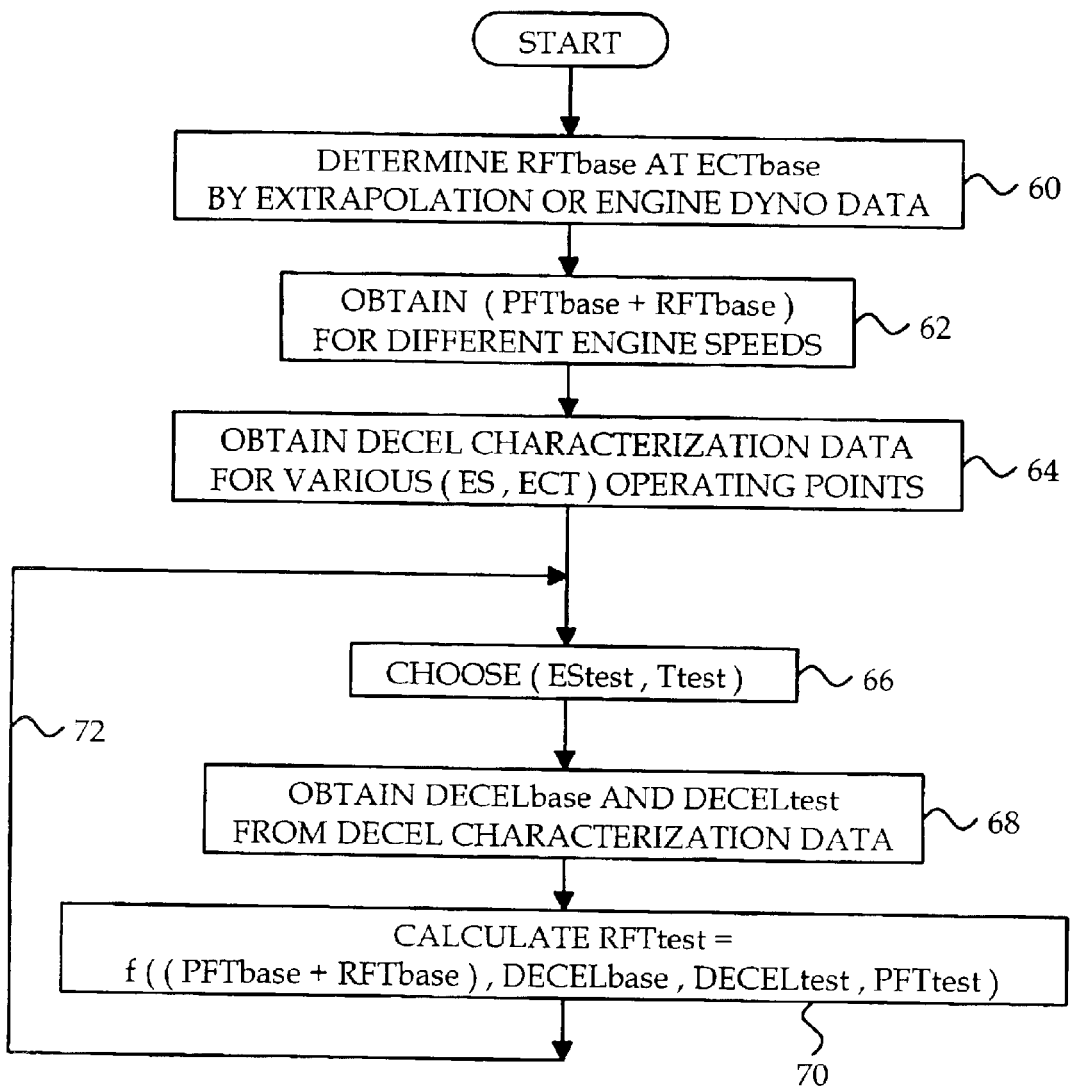
FIG. 5 is a process flow diagram depicting a determination of rubbing friction torque at any powertrain temperature and engine speed according to this invention.

Thus, the calibration process according to this invention involves the steps of (1) determining a base point rubbing friction torque $RFT_{base}$ at a base powertrain temperature $T_{base}$, (2) characterizing the fuel cutoff engine deceleration in terms of powertrain temperature and engine speed, and (3) computing and tabulating the rubbing friction torque for various combinations of powertrain temperature and engine speed by applying the base and deceleration characterization data to equation (3). This process is outlined by the process flow diagram of FIG. 5, as explained below.

Figure 3:
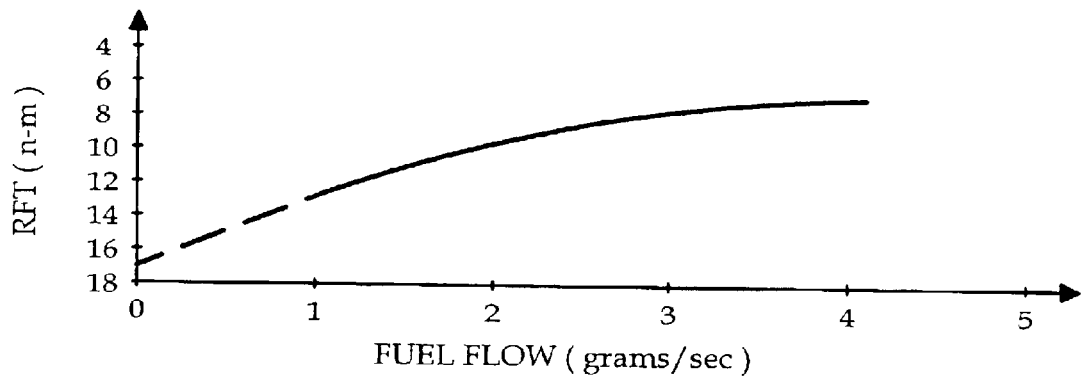
FIG. 3 is a graph depicting an extrapolation technique for determining a base rubbing friction torque according to this invention.

The base rubbing friction torque can be obtained by various techniques, including those discussed in the background portion hereof. An alternative technique is to estimate the rubbing friction torque during engine operation at a given powertrain temperature, and then extrapolate the data to a zero fuel-flow condition (i.e., a condition where the indicated torque IT is zero). This is illustrated by the graph of FIG. 3, which depicts the rubbing friction torque RFT as a function of fuel flow (in grams/sec) at a constant engine speed of 4400 RPM. The rubbing friction torque RFT data is obtained by measuring the brake torque BT of the engine 12 or powertrain 10 with a dynamometer, determining the indicated torque IT and pumping loss torque PFT from measured data and combustion analysis, and solving the following torque balance equation for RFT:

$$BT=IT-PFT-RFT \tag{4}$$

The solid portion of the trace in FIG. 3 represents the measured test data, whereas the broken portion of the trace designates an extrapolation of the measured test data for purpose of estimating RFT at zero fuel flow.

Figure 2:
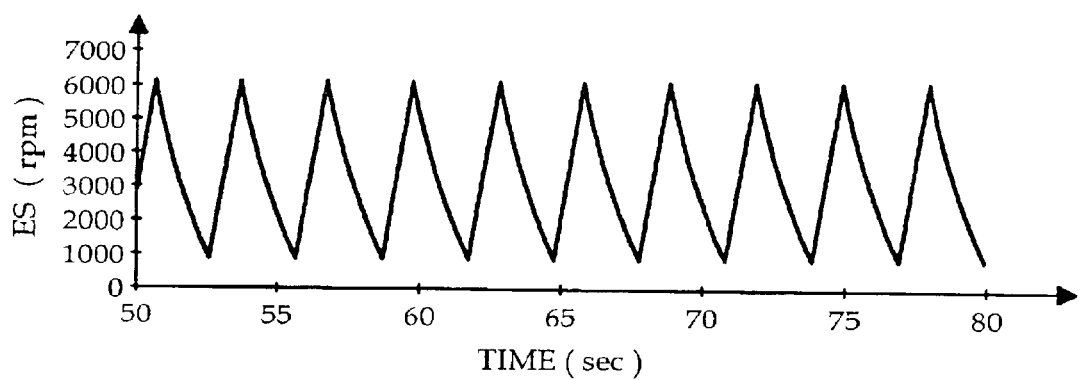
FIG. 2 is a graph depicting a control of engine speed carried out by the PCM of FIG. 1 during characterization of fuel cutoff engine deceleration according to this invention.
Figure 4:
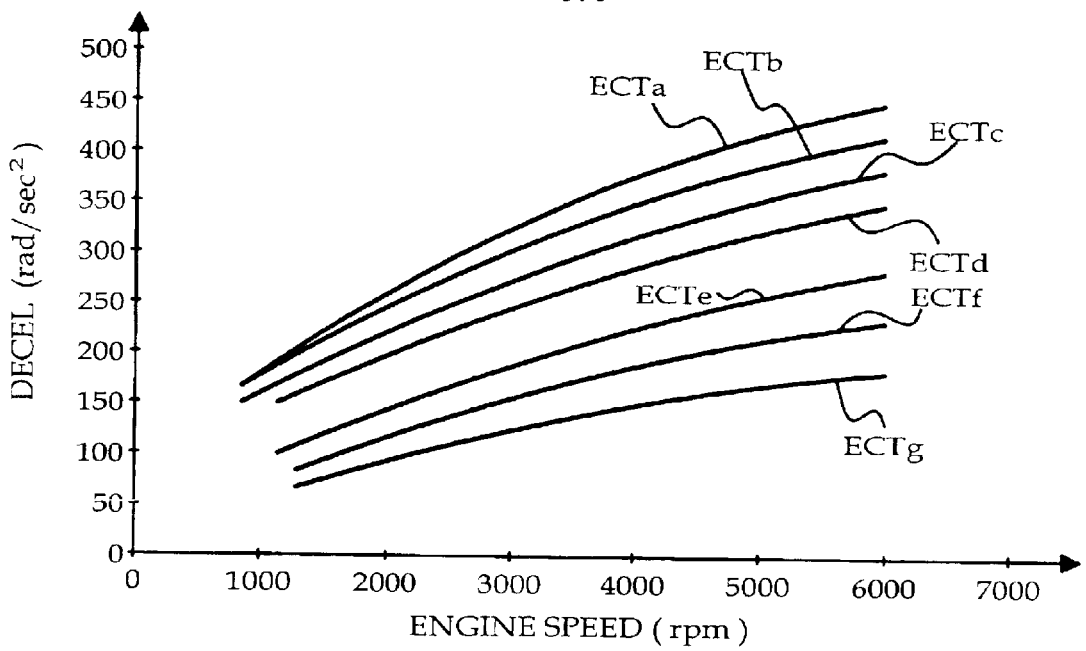
FIG. 4 is a graph depicting fuel cutoff engine deceleration data measured by the instrumentation apparatus of FIG. 1 for various powertrain temperatures and engine speeds.

FIG. 4 graphically depicts representative engine deceleration data obtained during the fuel cutoff intervals of the engine calibration testing depicted in FIG. 2. The various traces ECTa-ECTg represent deceleration data as a function of engine speed ES for various engine coolant temperatures, with trace ECTa representing a relatively low engine coolant temperature such as 24° C., and trace ECTg representing a relatively high engine coolant temperature such as 88° C. As mentioned above, transmission oil temperature TOT or another powertrain temperature could be used in place of the engine coolant temperature ECT, if desired. As indicated by the traces, the engine deceleration decreases with increasing powertrain temperature, and generally decreases with decreasing engine speed ES. In practice, the characterization data represented by the traces ECTa-ECTg can be tabulated in calibration instrument 50 so that the engine deceleration for any given combination of ES and ECT bounded by the traces ECTa-ECTg may be determined by interpolation.

As indicated above, once a base rubbing friction torque $RFT_{base}$ is determined at a base powertrain temperature $T_{base}$, and the data characterizing fuel cutoff deceleration (as represented by the traces of FIG. 4) is obtained, the rubbing friction torque $RFT_{test}$ at any other combination of engine speed and powertrain temperature ($ES_{test}$, $T_{test}$) may be determined using equation (3). Referring to the process flow diagram of FIG. 5, the blocks 60 and 62 pertain to obtaining the base rubbing friction data. As indicated at block 60, $RFT_{base}$ may be obtained by the extrapolation technique described above in respect to FIG. 3, or by the conventional engine dynamometer technique. The term $(RFT_{base}+PT_{base})$ appearing at block 62 is obtained at several different engine speed values, all at base temperature $T_{base}$. Block 64 represents the step of characterizing the engine deceleration by obtaining data in the fuel cutoff intervals of the engine depicted in FIG. 2; the resulting data is represented by the traces ECTa–ECTg in FIG. 4, and is tabulated in calibration instrument 50. The blocks 66, 68 and 70 designate the rubbing friction calculation performed by calibration instrument 50 once the steps designated by blocks 60–64 have been completed. An engine speed and powertrain temperature operating point ($ES_{test}$, $T_{test}$) is chosen at block 66, and the corresponding rubbing friction torque is determined at blocks 68 and 70. Block 68 designates the step of obtaining $DECEL_{base}$ and $DECEL_{test}$, from the engine deceleration characterization data. The term $DECEL_{base}$ is the fuel cutoff engine deceleration corresponding to the base temperature $T_{base}$ and the selected engine speed $ES_{test}$; the term $DECEL_{test}$ is the fuel cutoff engine deceleration corresponding to the selected temperature $T_{test}$ and the selected engine speed $ES_{test}$. Finally, the block 70 designates the step of calculating a rubbing friction torque $RFT_{test}$ based on ($RFT_{base}$+$PFT_{base}$), $DECEL_{base}$, $DECEL_{test}$ and $PFT_{test}$ using equation (3). The process flow line 72 indicates that the steps 66, 68 and 70 are repeated for various combinations of $ES_{test}$ and $T_{test}$, with the calculated rubbing friction torque values being stored in a look-up table within PCM 28 as a function of ES and powertrain temperature.

In summary, this invention provides a more comprehensive and cost-effective method of calibrating the rubbing friction torque of a motor vehicle powertrain, compared to known methods. Extended engine dynamometer testing is no longer required, and the data can be obtained in a fully assembled powertrain, using the PCM 28 to set up the conditions for characterizing fuel cutoff engine deceleration. Once the base rubbing friction data and the fuel cutoff deceleration data are obtained, the calibration data may be obtained in an automated manner by simply calculating the rubbing friction torque for various combinations of ES and ECT to build a two-dimensional calibration table for PCM 28. While the present invention has been described in reference to the illustrated embodiment, it is expected that various modifications in addition to those mentioned above will occur to those skilled in the art. Thus, it will be understood that methods incorporating these and other modifications may fall within the scope of this invention, which is defined by the appended claims.

What is claimed is:

1. A method of determining a rubbing friction torque for a motor vehicle powertrain including an internal combustion engine, the method comprising the steps of:

determining a base rubbing friction torque $RFT_{base}$ at a base temperature $T_{base}$ of said powertrain;

measuring and recording fuel cutoff deceleration values (DECEL) of said engine at a plurality of test temperatures of said engine including said base temperature $T_{base}$; and calculating a test rubbing friction torque $RFT_{test}$ at a given test temperature $T_{test}$ according to:

$$RFT_{test}=(RFT_{base}*DECEL_{test})/DECEL_{base}$$

where $DECEL_{test}$ is the fuel cutoff deceleration at test temperature $T_{test}$ and $DECEL_{base}$ is the fuel cutoff deceleration at base temperature $T_{base}$.

2. The method of claim 1, including the steps of:

obtaining a base pumping loss $PFT_{base}$ of said engine at said base temperature $T_{base}$;

obtaining a test pumping loss $PFT_{test}$ of said engine at said test temperature $T_{test}$; and calculating said test rubbing friction torque $RFT_{test}$ according to:

$$RFT_{rest} = (RFT_{base} + PFT_{base}) \times \frac{DECEL_{test}}{DECEL_{base}} - PFT_{test}.$$

3. The method of claim 1, including the step of:

recording said fuel cutoff deceleration values (DECEL) of said engine as a function of both test temperature $T_{test}$ and engine speed.

4. The method of claim 1, including the steps of:

measuring said fuel cutoff deceleration values (DECEL) at a plurality of engine speeds for each of said test temperatures $T_{test}$; and recording the measured fuel cutoff deceleration values (DECEL) as a function of both test temperature $T_{test}$ and engine speed.

5. The method of claim 1, wherein the step of determining said base rubbing friction torque $RFT_{base}$ includes the steps of:

determining rubbing friction torque test data during engine operation at a substantially constant speed and different engine fuel flow values; and extrapolating said rubbing friction torque test data to a zero engine fuel flow to obtain said base rubbing friction torque $RFT_{base}$.

6. The method of claim 1, including the steps of:

alternately enabling and cutting off fuel flow to said engine to cycle a speed of said engine between first and second setpoints to define recurring intervals of fuel cutoff deceleration; and measuring said fuel cutoff deceleration values during said recurring intervals of fuel cutoff deceleration.

\* \* \* \* \*